United States Patent [19]
Ipposhi et al.

[11] Patent Number: 5,357,365
[45] Date of Patent: Oct. 18, 1994

[54] LASER BEAM IRRADIATING APPARATUS ENABLING UNIFORM LASER ANNEALING

[75] Inventors: Takashi Ipposhi; Tadashi Nishimura, both of Hyogo, Japan

[73] Assignee: Mitsubishi Denki Kabushiki Kaisha, Tokyo, Japan

[21] Appl. No.: 62,631

[22] Filed: May 18, 1993

[30] Foreign Application Priority Data

Oct. 26, 1992 [JP] Japan .................................. 4-287453

[51] Int. Cl.⁵ ...................... G02B 26/08; H01L 21/477
[52] U.S. Cl. ..................... 359/205; 359/196; 359/900; 437/174
[58] Field of Search ............... 359/196, 201, 202, 205, 359/206, 345, 212–214, 900; 250/484.4, 488.1; 156/657, 620, 600, 603, 620.7; 437/17, 174; 313/367; 428/421

[56] References Cited

U.S. PATENT DOCUMENTS

| | | | |
|---|---|---|---|
| 4,048,535 | 9/1977 | Cox et al. | 313/367 |
| 4,469,527 | 9/1984 | Sugano et al. | 437/17 |
| 4,536,251 | 8/1985 | Chiang et al. | 156/657 |
| 4,693,758 | 9/1987 | Kobayashi et al. | 437/174 |
| 4,915,772 | 4/1990 | Fehlner et al. | 156/620.7 |
| 4,963,751 | 10/1990 | Kano et al. | 250/484.4 |
| 5,246,782 | 9/1993 | Kennedy et al. | 428/421 |

Primary Examiner—Loha Ben
Assistant Examiner—James Phan
Attorney, Agent, or Firm—Lowe, Price, LeBlanc & Becker

[57] ABSTRACT

A laser beam irradiating apparatus is capable of laser annealing with high precision and uniform over the entire surface of a sample. Luminous flux of the laser beam output from a laser source is expanded by a beam expander. The power of the laser beam which has passed through the beam expander is adjusted by a half-wave plate of synthetic quarts and a polarizing prism of synthetic quarts. The laser beam emitted from polarizing prism is guided to a prescribed position by mirrors, and swung in the direction of the X-axis by an X-axis rotation mirror. The laser beam reflected from X-axis rotation mirror has its diameter reduced by a f-θ lens to have a prescribed beam spot diameter on the surface of a silicon wafer, and laser beam scanning is carried out at a constant speed. Since half-wave plate and the polarizing prism are formed of synthetic quarts, thermal deformation of optical components caused by continuous irradiation of laser beam can be suppressed, beam profile of the laser beam can be stabilized, therefore highly uniform and highly precise laser annealing becomes possible.

24 Claims, 10 Drawing Sheets

LASER BEAM IRRADIATING APPARATUS ENABLING UNIFORM LASER ANNEALING

BACKGROUND OF THE INVENTION

1. Field of the Invention

The present invention relates to a laser beam irradiating apparatus for annealing with a laser beam and, more specifically, to a laser beam irradiating apparatus used for forming a semiconductor substrate during manufacturing of semiconductor devices.

2. Description of the Background Art

A so-called SOI (Silicon On Insulator) structure in which a single crystal semiconductor layer is formed on an insulator is promising as a substrate material of VLSIs of the next generation. A method of melting and re-crystallization employing laser beam (laser anneal method) is one of the methods of manufacturing the SOI, in which a semiconductor layer of non-single crystal formed on an insulator is melted and re-solidified by laser beam irradiation so as to obtain a single crystal layer. Recently, laser anneal method has also attracted attention as a method of forming a polycrystalline semiconductor layer having large grain size on an insulator.

FIG. 8 is a block diagram showing one example of a conventional laser beam irradiating apparatus used for laser annealing. As shown in FIG. 8, the laser beam irradiating apparatus includes an argon ion laser source 1, shutters 2 and 3, a beam expander 4, a half-wave plate 5, a polarizing prism 6, total reflection mirrors 7 and 8, an X-axis rotation mirror 9, an f-$\theta$ lens 10, a reflecting mirror 11, a focus stage 12, a Y-axis stage 13, a susceptor 15 and a heater 16.

Argon ion laser source 1 generally has sufficient output to melt a non-single crystal layer and high output stability, and it is capable of continuous wave in the order of 20 W. Shutters 2 and 3 rotate to shut the path of the laser beam to stop laser beam irradiation. Beam expander 4 expands luminous flux of the laser beam emitted from argon ion laser source 1. Half-wave plate 5 receives the laser beam which has passed through beam expander 4 to change the inclination of the plane of polarization of the incident laser beam. Polarizing prism 6 receives the linearly polarized laser beam which has passed through half-wave plate 5, partially transmits the incident laser beam at a ratio corresponding to the inclination of the plane of polarization and reflects the remaining part of the laser beam in the orthogonal direction. Total reflection mirrors 7 and 8 reflect the laser beam which has been reflected in the direction orthogonal to the incident direction by polarizing prism 6, by a prescribed angle to guide the laser beam to a prescribed position. X-axis rotation mirror 9 changes the angle of reflection of the laser beam in the direction of the X-axis. F-$\theta$ lens 10 receives the laser beam which has been swung by X-axis rotation mirror 9, reduces the diameter of the laser beam such that the beam diameter becomes about 150 $\mu$m$\phi$ on the surface of a silicon wafer 14 which is the object to be processed, and irradiates the laser beam while scanning the surface at a constant speed. Reflecting mirror 11 reflects the laser beam which has passed f-$\theta$ lens 15 and guides the same to the surface of the object 14 to be processed. Focus stage 12 holds X-axis rotation mirror 9 and f-$\theta$ lens 10, and adjusts focal length by changing the distance between f-$\theta$ lens 10 and mirror 11. Y-axis stage 13 holds X-axis rotation mirror 9, f-$\theta$ lens 10 and mirror 11, and it moves the position to be irradiated with laser beam on the surface of the object 14 in the Y direction, by moving these components in the Y direction. Susceptor 15 is for holding a silicon wafer 14. Heater 16 heats the silicon wafer 14 to improve efficiency of re-crystallization by the laser beam.

The output stability of continuous wave argon ion laser source 1 is, at present, about $\pm 0.5\%$, which is satisfactory when uniformity of the laser power required in laser annealing is taken into consideration.

The laser beam passes through optical components such as a plurality of mirrors 7, 8, 9 and 11, lenses 4 and 10 and so on and directed to the surface of a sample (silicon wafer 14) held by susceptor 15. In this example, the power of irradiating laser is adjusted by half-wave plate 5 and polarizing prism 6. Scanning of laser beam is carried out by X-axis rotation mirror 9 in the X direction, and by movement of Y-axis stage 13 in the Y direction.

The laser beam has its diameter reduced to about 150 $\mu$m$\phi$ through f-$\theta$ lens 10 and irradiates the surface of the sample. Though it depends on the laser output and speed of scanning of the laser beam, a strip-shaped area extending in the X direction having the width of about several ten to several hundred $\mu$m is re-crystallized by one laser beam scanning in the X direction. Therefore, re-crystallization of the entire surface of the sample is achieved by repeating a procedure in which laser beam scanning in the X direction is done, the laser beam is moved in the Y direction such that the area re-crystallized by the last laser beam scanning in the X direction is partially overlapped with the area to be re-crystallized, and again the laser beam scanning in the X direction is carried out.

However, when laser annealing is effected by the conventional laser beam irradiating apparatus, the entire surface of the sample can not be uniformly re-crystallized, as will be described hereinafter. Specifically, the area which is re-crystallized by one laser beam scanning in the X direction and in the Y direction differs from the width of the area re-crystallized by another laser beam scanning.

It has been considered that this difference or variation of the width of the area which is re-crystallized stems from a power loss of the laser beam. Thus laser beam power was measured by means of a calorimeter. However, the laser beam power did not change at all, and the cause of variation could not be found.

Presently, materials of optical components used in such a laser beam irradiating apparatus are selected on the basis that the optical components are not damaged by laser beam irradiation, and that power loss of the laser beam is small. Based upon such considerations, optical components formed of an optical glass, such as BK7, are used without any problem for an argon ion laser of the order of 20 W.

The inventors have discovered that the source of the problem of variation of the width of the area which is re-crystallized does not stem from a power loss of the laser beam, but caused by fluctuation of laser beam power distribution caused by thermal deformation with age of the optical components.

FIG. 9 shows a result of measurement of laser beam power distribution in the direction of the diameter of a laser beam spot when a pin hole is moved in the direction of the diameter of the beam spot and the laser beam transmitted through the pin hole is measured by measuring equipment, in the conventional optical system using the optical material BK7. As shown in FIG. 9, power distribution of the laser beam (hereinafter referred as beam profile) was measured and it was found that the beam profile rapidly changes as time passes from the start of laser beam irradiation. In FIG. 9, the abscissa corresponds to the position in the diametrical direction of the laser beam spot, while the ordinate corresponds to the laser power per a prescribed unit area. FIG. 9 shows results of several measurements carried out at prescribed intervals while continuously irradiating the laser beam to find variation of the beam profile. It is considered that variation of the beam profile is due to thermal deformation of optical components as the components were locally heated by the laser beam irradiation.

FIG. 10 shows a state of re-crystallized areas on the surface of a sample which has been subjected to laser annealing by a laser beam irradiating apparatus employing a half-wave plate 5 and a polarizing prism 6, of which base material is optical glass BK7. Referring to the figure, hatched portions represent re-crystallized areas. The laser beam scans in the X direction and the scanning is successively repeated in the Y direction. As is apparent from this figure, the width of the area re-crystallized by one scanning decreases as the scanning proceeds in the Y direction. As stated previously, by the conventional method of evaluation in which laser beam power is measured by a calorimeter, there is no change found in the laser beam power. However, as shown in FIG. 9, only the area irradiated by the laser beam having power higher than a prescribed level W1 of the laser beam spot is re-crystallized. Therefore, if the beam profile changes and the power at the central portion of the spot decreases, the area which can be re-crystallized becomes narrower. This is the reason why the width of the area which is re-crystallized varies even though the laser beam power itself does not vary. If the laser beam having sufficiently larger power than necessary for re-crystallization is irradiated, there is not a possibility of failure in re-crystallization. However, the width of the area which is re-crystallized still changes.

SUMMARY OF THE INVENTION

An object of the present invention is to provide a laser beam irradiating apparatus and method enabling uniform laser annealing.

An additional object of the present invention is to stabilize the beam profile of the laser beam generated by the laser beam irradiating apparatus.

According to one aspect, the above and other objects can be attained by the laser beam irradiating apparatus of the present invention which is an apparatus for scanning a surface of an object to be processed with a laser beam through an optical system while irradiating the same with laser beam so as to anneal the object to be processed, wherein the optical system includes, at least partially, an optical component formed of an optical material having a smaller coefficient of thermal expansion than the optical material BK7.

According to another aspect of the present invention, the optical system of the laser beam irradiating apparatus of the present invention includes, at least partially, an optical component formed of an optical material having a smaller coefficient of thermal expansion than that of the optical material BK7, the optical component includes an optical component for reflecting the laser beam, basically formed of the optical material having a smaller coefficient of thermal expansion than that the optical material BK7.

According to a still further aspect of the present invention, in the above described optical system, the optical component reflecting the laser beam includes a mirror having a reflective coating film formed of a dielectric multilayered film on a surface of a substrate employing an optical material having a smaller thermal expansion coefficient than that of the optical material BK7.

According to a still further aspect of the present invention, in the above described optical system, the aforementioned optical component includes an optical component transmitting laser beam formed of an optical material having a smaller thermal expansion coefficient than that of the optical material BK7.

According to a still further aspect of the present invention, in the above described optical system, the optical component transmitting the laser beam includes a lens-unit optical component formed of an optical material having a smaller thermal expansion coefficient than that of the optical material BK7.

According to still further aspect of the present invention, in the above described optical system, the optical component transmitting the laser beam includes a non-lens-unit optical component formed of an optical material having a smaller thermal expansion coefficient than that of the optical material BK7.

According to a still further aspect of the present invention, in the above described optical system, the optical material having a smaller thermal expansion coefficient than that of the optical material BK7 includes quartz.

According to a still further aspect of the present invention, in the above described optical system, the quartz includes synthetic quartz.

According to a still further aspect of the present invention, in the above described optical system, the optical material having a smaller thermal expansion coefficient than that of the optical material BK7 includes a ceramic.

An advantage of the present invention is, since a material having a smaller thermal expansion coefficient than BK7 is used as the material of the optical component, thermal deformation of optical component caused by change of temperature by laser beam irradiation can be suppressed, and hence fluctuation of power distribution of the laser beam can be prevented. Consequently, the width of the area which is re-crystallized by every laser beam scanning can be made uniform, enabling uniform laser annealing over the entire surface of the sample.

Another advantage of the present invention is that since a material having a smaller thermal expansion coefficient than BK7 is used as a material of the substrate of the optical component for reflecting the laser beam, thermal deformation of the optical component reflecting the laser beam caused by the temperature change by the laser beam irradiation can be suppressed, and fluctuation of power distribution of the laser beam reflected by the optical component can be prevented. Consequently, the width of the area which is re-crystallized by every laser beam scanning becomes uniform, enabling uniform laser annealing over the entire surface of the sample.

A further advantage of the present invention is that since a reflective coating of a dielectric multilayered film is applied on a surface of a substrate formed of a material having a smaller thermal expansion coefficient than BK7, the laser beam can be efficiently reflected with smaller power loss, and therefore thermal deformation of mirrors caused by change in temperature by laser beam irradiation can be suppressed, and fluctuation of power distribution of the laser beam reflected by the mirror can be prevented. Consequently, the width of the area which is re-crystallized by every laser beam scanning becomes uniform, enabling uniform laser annealing over the entire surface of the sample.

A further advantage of the present invention is that, since a material having a smaller thermal expansion coefficient than BK7 is used as the material for the optical component, thermal deformation of the optical component transmitting the laser beam caused by the temperature change by the laser beam irradiation can be suppressed, and hence fluctuation of power distribution of the laser beam transmitting with the optical component can be prevented. Consequently, the width of the area which is re-crystallized by every laser beam scanning becomes uniform, enabling uniform laser annealing over the entire surface of the sample.

A still further advantage of the present invention is that, since a material having a smaller expansion coefficient than BK7 is used as the optical material, thermal deformation of the lens-unit optical component caused by the temperature changes by the laser beam irradiation can be suppressed, and fluctuation of power distribution of the laser beam which has its luminous flux expanded or reduced by the transmission through the optical component can be suppressed. Consequently, the width of the area which is re-crystallized by every laser beam scanning becomes uniform, enabling uniform laser annealing over the entire surface of the sample.

A still further advantage of the present invention is that, since a material having a smaller thermal expansion coefficient than BK7 is used as the optical material of the optical component, thermal deformation of the non-lens-unit optical component caused by temperature change by the laser beam irradiation can be suppressed, and therefore fluctuation of power distribution of the laser beam which has its power adjusted by transmission through the optical component, for example, can be prevented. Therefore, the width of the area which is re-crystallized by every laser beam scanning becomes uniform, enabling uniform laser annealing over the entire surface of the sample.

A still further advantage of the present invention is that, since quartz has a smaller thermal expansion coefficient than the optical material BK7 and is superior as an optical material, thermal deformation of the optical component caused by the temperature change by laser beam irradiation can be suppressed, and therefore fluctuation of power distribution of the laser beam by the optical component can be prevented. Therefore, the width of the area which is re-crystallized by every laser beam scanning becomes uniform, enabling uniform laser annealing over the entire surface of the sample.

A still further advantage of the present invention is that, since the synthetic quartz has a smaller thermal expansion coefficient than the optical material BK7 and it is, among other quartz, especially superior as an optical material, thermal deformation of the optical component caused by temperature change by the laser beam irradiation can be suppressed, and fluctuation of power distribution of the laser beam by the optical component can be prevented. Therefore, the width of area which is re-crystallized by every laser beam scanning becomes uniform, enabling uniform laser annealing over the entire surface of the sample.

A still further advantage of the present invention is that, since ceramics has a very small thermal expansion coefficient as compared with the optical material BK7, thermal deformation of the optical component caused by the temperature change by laser beam irradiation can be very much suppressed, and therefore fluctuation of laser beam power distribution by the optical component can be prevented. Therefore, the width of the area which is re-crystallized by every laser beam scanning becomes uniform, enabling uniform laser annealing over the entire surface of the sample.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 8:
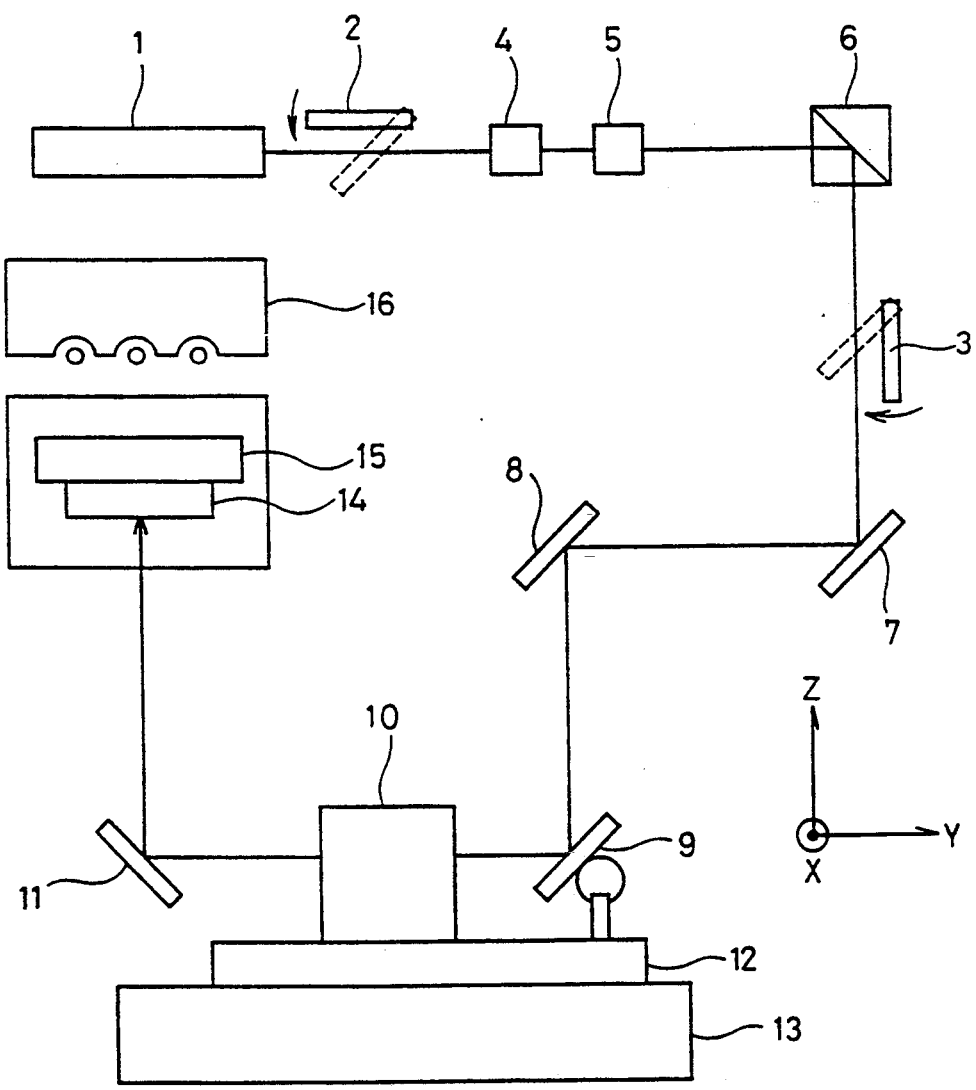
FIG. 8 is a block diagram showing a structure of a conventional laser beam irradiating apparatus.

The optical components of the laser beam irradiating apparatus shown in FIG. 8 can be classified into ones through which laser beam is transmitted (for example, a beam expander 4, half-wave plate 5 and polarizing prism 6) and ones reflecting the laser beam and through which the laser beam is not transmitted, such as mirrors 7, 8, 9 and 11. Further, among the optical components through which the laser beam is transmitted, there are components incorporating lens-unit (for example beam expander 4 and f-$\theta$ lens 10), and non-lens-unit components (half-wave plate 5 and polarizing prism 6).

Among the optical components transmitting the laser beam, f-$\theta$ lens 10 is least susceptible to the influence of thermal deformation. The reason is that the laser beam is moved by the X-axis rotation mirror 9 in the f-$\theta$ lens 10, while the laser beam is continuously irradiated at one point at the beam expander 4, half-wave plate 5 and at the polarizing prism 6. Therefore, it is assumed that the f-$\theta$ lens 10 does not match degrade uniformity of the laser beam irradiating apparatus. Beam expander 4 is used for setting special conditions of laser annealing, and it is not necessary in usual laser annealing.

Figure 1:
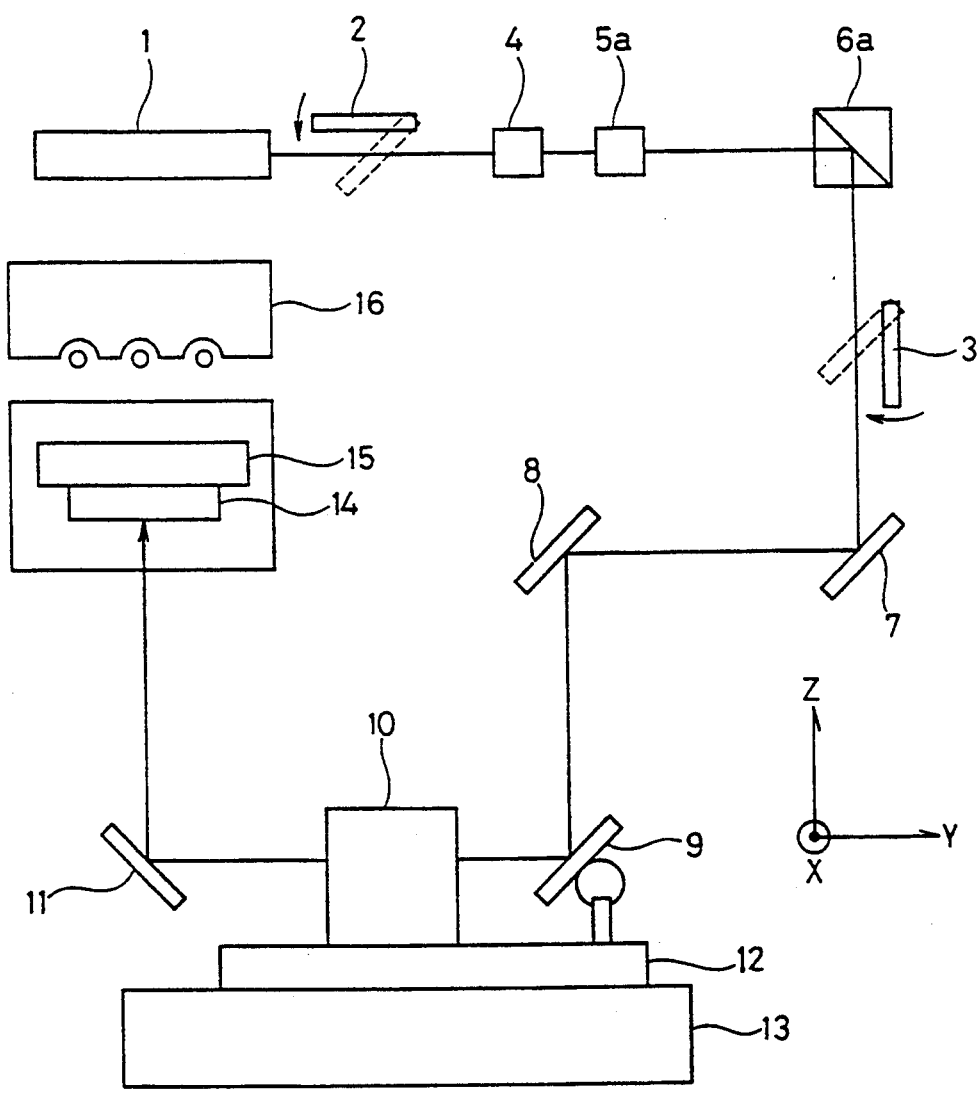
FIG. 1 is a block diagram showing a structure of one embodiment of a laser beam irradiating apparatus in accordance with the present invention.

In view of the foregoing, the inventor decided to address the half-wave plate and the polarizing prism at first. A first embodiment of the present invention based on such view point will be described with reference to FIG. 1. As shown in FIG. 1, the laser beam irradiating apparatus includes an argon ion laser source 1, shutters 2 and 3, a beam expander 4, a half-wave plate 5a, a polarizing prism 6a, total reflection mirrors 7 and 8, an X-axis rotation mirror 9, a f-θ lens 10, a reflection mirror 11, a focus state 12, a Y-axis stage 13, a susceptor 15 and a heater 16.

The first embodiment is characterized by half-wave plate 5a and polarizing prism 6a. Half-wave plate 5a receives the laser beam which has passed through beam expander 4 and changes inclination of the plane of polarization of the incident laser beam, which plate is formed of synthetic quartz. Polarizing prism 6a receives linearly polarized laser beam which has passed through half-wave plate 5a, partially transmits the incident laser beam at a ratio corresponding to the inclination of the plane of polarization, and perpendicularly reflects the remaining laser beam, which prism is formed by bonded synthetic quartz. Portions denoted by the same reference characterize as in FIG. 8 denote the same or corresponding portions. More specifically, argon ion laser source 1 generally has sufficient output for melting non-single crystal layer and high output stability, and capable of continuous wave in the order of 20 W. Shutters 2 and 3 are to stop laser beam irradiation by intercepting the passage of the laser beam. Beam expander 4 is to expand luminous flux of the laser beam output from argon ion laser beam 1. Total reflection mirrors 7 and 8 reflect the laser beam which has been reflected perpendicularly with the incident beam by the polarizing prism 6a at a prescribed angle to bring the laser beam to a prescribed position. X-axis rotation mirror 9 changes the angle of reflection of the laser beam in the direction of the X-axis. F-θ lens 10 receives the laser beam which has been swung by the X-axis rotation mirror 9, reduces the diameter of the laser beam to be about 150 $\mu m\phi$ on the surface of the object 14 to be processed, for scanning and irradiating laser beam at a constant speed. Reflection mirror 11 reflects the laser beam which has been transmitted through f-θ lens 10 to bring the laser beam to the surface of the object 14 to be processed. Focus stage 12 supports X-axis rotation mirror 9 and f-θ lens 10, and adjusts focal length by changing the distance between f-θ lens 10 and mirror 11. Y-axis stage 13 holds X-axis rotation mirror 9, f-θ lens 10 and mirror 11, and moves the position of laser beam irradiation on the surface of the object 14 to be processed in the direction of Y-axis, by moving these components in the Y direction. Susceptor 15 holds the silicon wafer 14 which is the object of processing. Heater 16 heats the silicon wafer 14 so as to improve efficiency of re-crystallization by the laser beam.

As described above, the half-wave plate 5a and polarizing prism 6a used in the laser beam irradiating apparatus of the first embodiment of the present invention have the same structure as in the prior art except that the materials thereof are synthetic quartz and not the optical glass BK7 which was used for the half-wave plate 5 and the polarizing prism 6 employed in the conventional laser beam irradiating apparatus.

Figure 2:
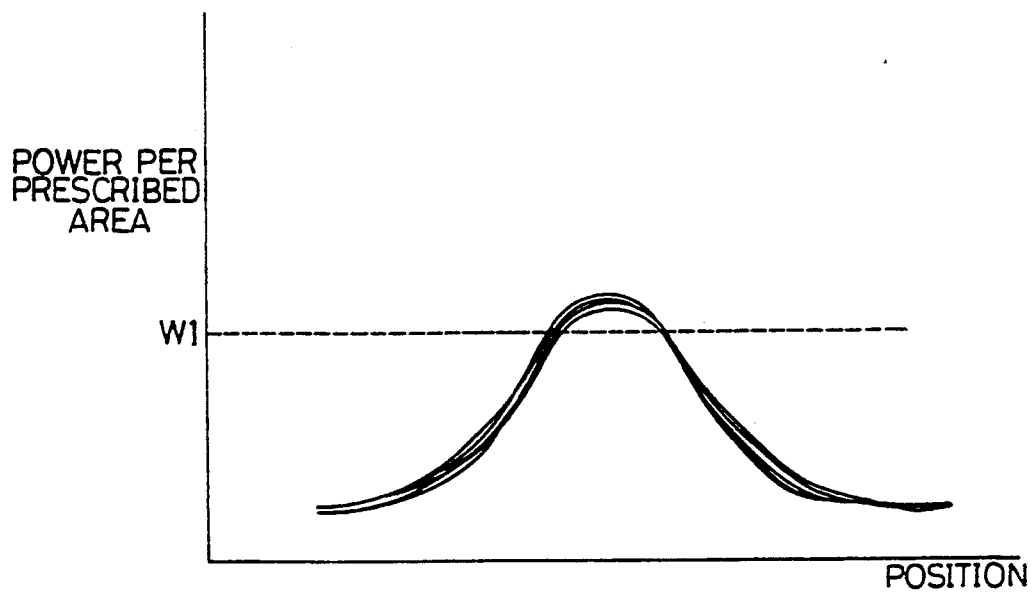
FIG. 2 shows a laser beam profile of the laser beam irradiating apparatus shown in FIG. 1.
Figure 3:
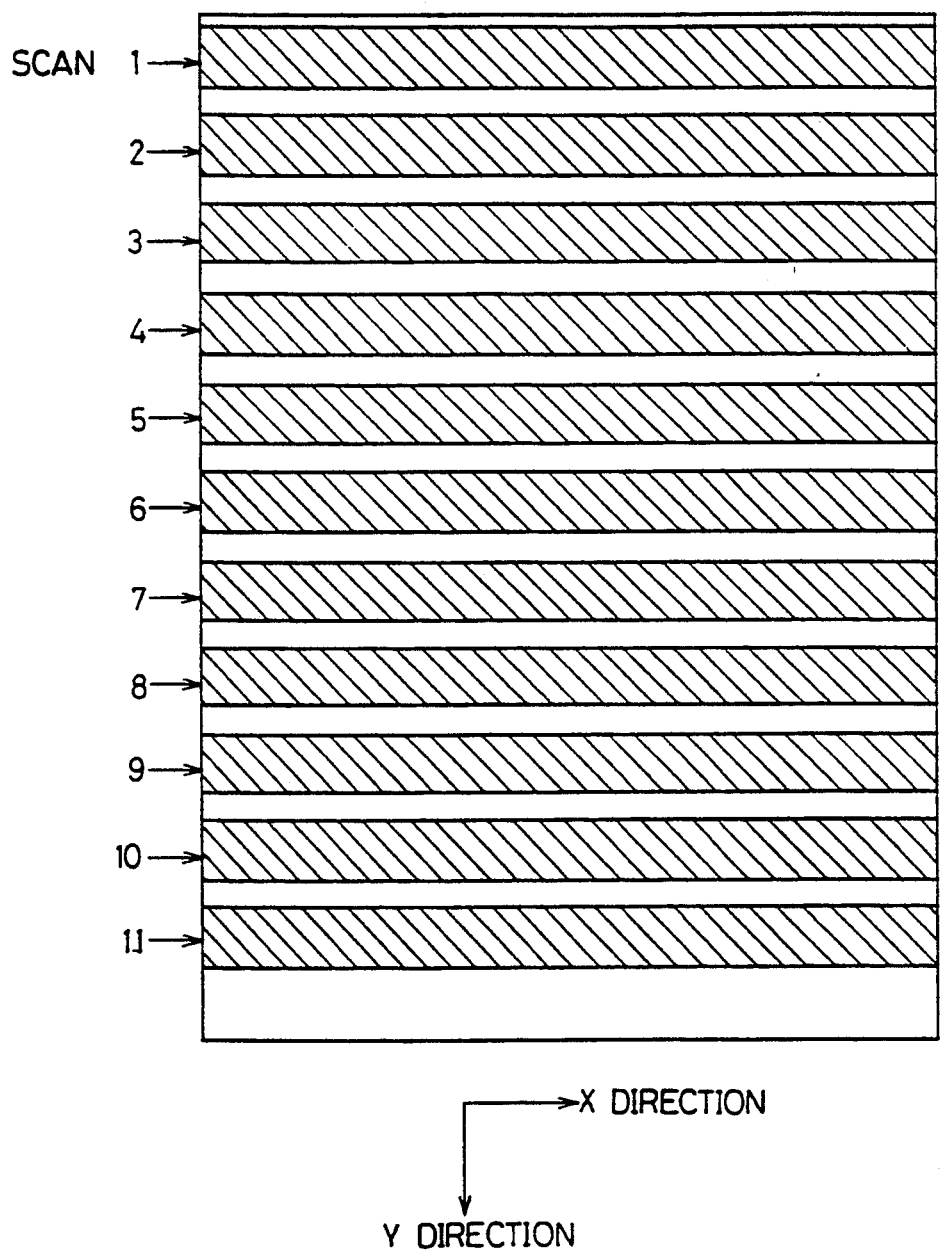
FIG. 3 shows the state of re-crystallized area of the sample processed by the laser beam irradiating apparatus shown in FIG. 1.
Figure 9:
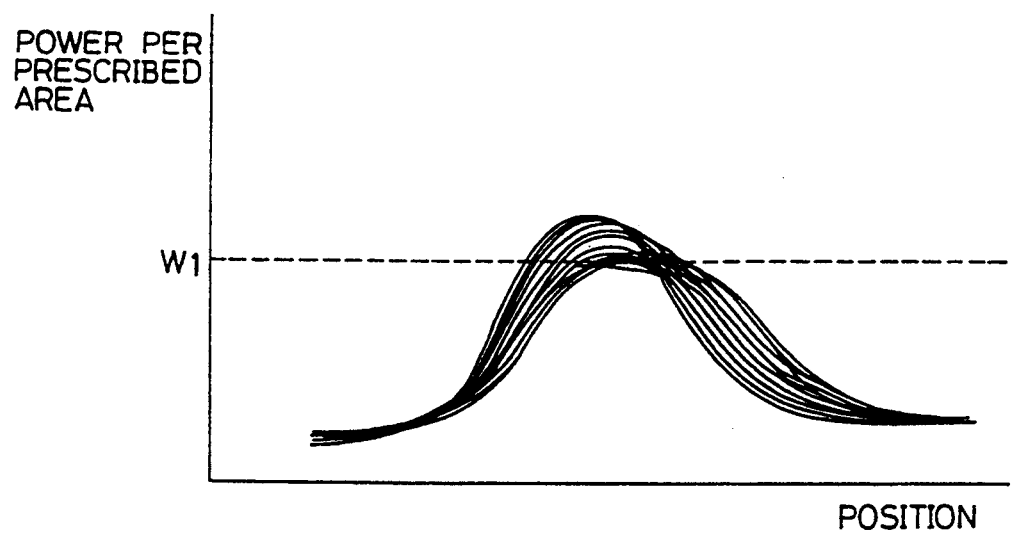
FIG. 9 shows a laser beam profile of the conventional laser beam irradiating apparatus shown in FIG. 8.
Figure 10:
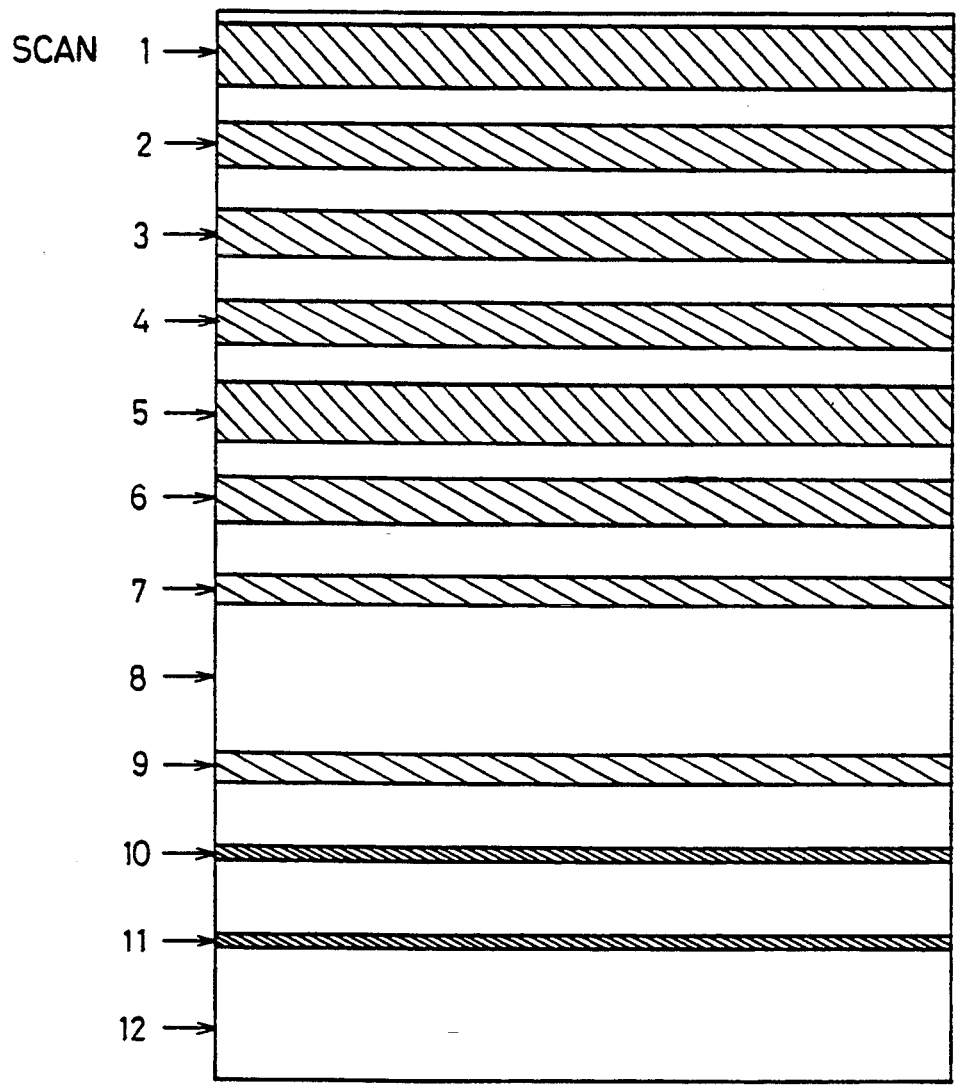
FIG. 10 shows a state of re-crystallized area on the surface of the sample processed by the conventional laser beam irradiating apparatus shown in FIG. 8.
Figure 10:
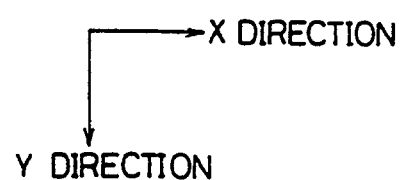

Thermal expansion coefficient of the optical glass BK7 is about $7\times 10^{-6}/°C$. Quartz is one of the materials for optical components having a smaller thermal expansion coefficient. For example, the synthetic quartz industrially manufactured has thermal expansion coefficient of about $6\times 10^{-7}/°C$., which is smaller than that of BK7 by more than one order of magnitude. FIG. 2 shows the result of evaluation similar to the show in Fig. 9 with half-wave plate 5 and polarizing prism 6 replaced by ones formed of synthetic quartz. FIG. 3 shows the state of re-crystallization of the surface of the sample which has been subjected to laser annealing by the laser beam irradiating apparatus shown in FIG. 1. As shown in FIG. 3, the width of the area which is re-crystallized is considerably made uniform as compared with the example employing BK7. This is because the stability of the beam profile is remarkably improved as compared with the example of BK7, and power necessary for re-crystallization can be stably obtained near the center of the beam spot, as can be understood from the beam profile of FIG. 2.

Therefore, according to the laser beam irradiating apparatus of the present invention, the uniformity of the width of the re-crystalize areas can be significantly improved.

For bonding the polarizing prism 6a, epoxy adhesive or synthetic polyester adhesive is used. It is confirmed that these two adhesives provide a polarizing prism of a superior quality. Such a bonded type polarizing prism is inexpensive and easy to manufacture. Other than the bonded type prism, an air gap type polarizing prism may be used, and the present invention can be also applied to such polarizing prisms.

As shown in the first embodiment, by forming the half-wave plate and the polarizing prism by quartz, uniformity of the width of the area to be re-crystallized can be significantly improved. However, the beam profile of FIG. 2 still has some variation. For applications requiring laser annealing of higher precision, such variation should be suppressed as much as possible.

Figure 4:
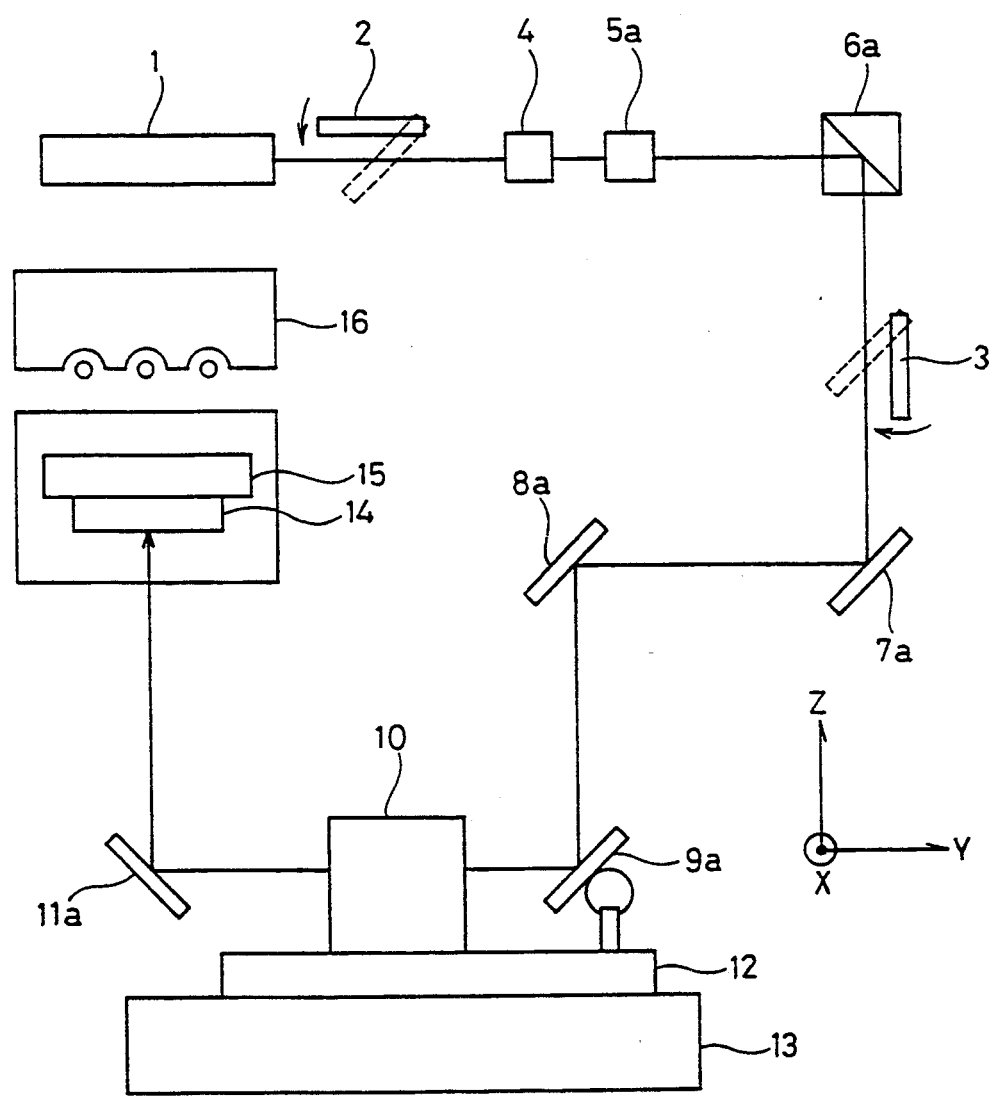
FIG. 4 is a block diagram showing a structure of a second embodiment of the laser beam irradiating apparatus in accordance with the present invention.

A second embodiment implemented for further improving uniformity of the width of the area of re-crystallization will be described with reference to the figures. FIG. 4 is a block diagram showing a structure of a second embodiment of the laser beam irradiating apparatus in accordance with the present invention. In the laser beam irradiating apparatus of the first embodiment shown in FIG. 1, the laser beam is reflected four times by mirrors 7, 8, 9 and 11 until it reaches the sample. In the laser beam irradiating apparatus shown in FIG. 1, BK7 was used as the material of the substrates of the mirrors 7, 8, 9 and 11 as in the prior art. These mirrors 7, 8, 9 and 11 were replaced by mirrors 7a, 8a, 9a and 11a the material of the substrate of which is synthetic quartz, and stability of the beam profile were evaluated. Here, total reflection mirrors 7a and 8a reflect the incident light at prescribed angles to guide the laser beam which has been reflected perpendicularly by the polarizing prism 6a of synthetic quartz to a prescribed position, and they employ synthetic quartz as their substrates. X-axis rotation mirror 9a employs synthetic quartz for its substrate, and changes the angle of reflection of the laser beam in the direction of the X-axis. The total reflection mirror 11a reflects the laser beam which has passed through f-θ lens 10 to bring the laser beam to the surface of the object 14 to be processed, and it employs synthetic quartz as its substrate material.

Figure 5:
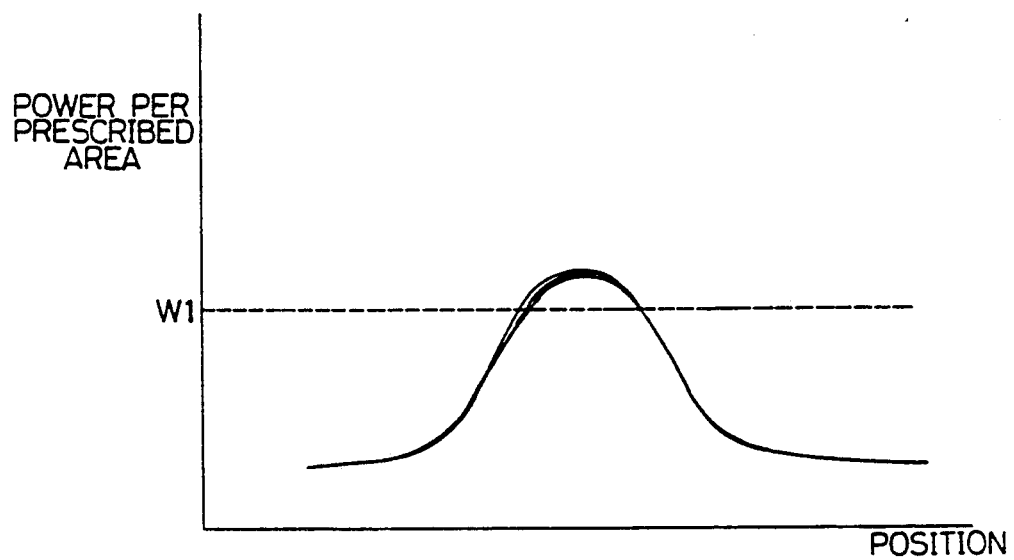
FIG. 5 shows a laser beam profile of the laser beam irradiating apparatus shown in FIG. 4.

FIG. 5 shows a beam profile of the laser beam irradiating apparatus shown in FIG. 4 measured in the similar manner as the embodiment of FIG. 2. Compared with the result shown in FIG. 2, the stability of the beam profile is considerably improved by replacing mirrors formed of optical glass BK7 by mirrors formed of synthetic quarts. Consequently, a laser beam irradiating apparatus enabling laser annealing of higher precision can be obtained.

Although synthetic quartz is used as the substrate material of the mirror, it is not necessary to take into consideration the transmission of laser beam therethrough in case of mirrors. Therefore, a material having a very small thermal expansion coefficient such as a ceramic material known by the commercial name ZERODURE manufactured by Schott Glass Technologies, Inc. (thermal expansion coefficient listed in commercial brochure: $0.05 \pm 0.10 \times 10^{-6}/°C$.) may be used. Other materials such as ceramics, molten quarts or the like which have a smaller thermal expansion coefficient than BK7 may be used to provide the same effect.

Now, let us consider the cause of thermal deformation of mirrors. Generally, a reflective coating is applied on a total reflection mirror so as to enable efficient reflection of light. However, the reflectance is not 100%. More specifically, the loss at the time of reflection is transmitted to the substrate, which light may be the cause of thermal deformation. Therefore, a reflective coating having as high reflectance as possible should be employed. Reflective coatings of metal deposited film and the like have the reflectance of about 97%, although such coatings can be used in wide range of wavelength. Meanwhile, reflective coatings formed by multi-layers of dielectric thin films having different refractive indexes have very high reflectance of 99.8% or higher, although the available range of wavelength becomes narrower. What is employed in this invention is laser beam, because wide range of wavelength is not necessary. Therefore, a reflective coating of dielectric multi-layered film can be used. This can further stabilize the beam profile. As for the above description, it is needless to say that the substrates and reflective coatings which have sufficient characteristics not to be damaged by the laser beam are used. It is also needless to say that the higher the surface precision of the mirror substrate, the more stable becomes the beam profile.

Figure 6:
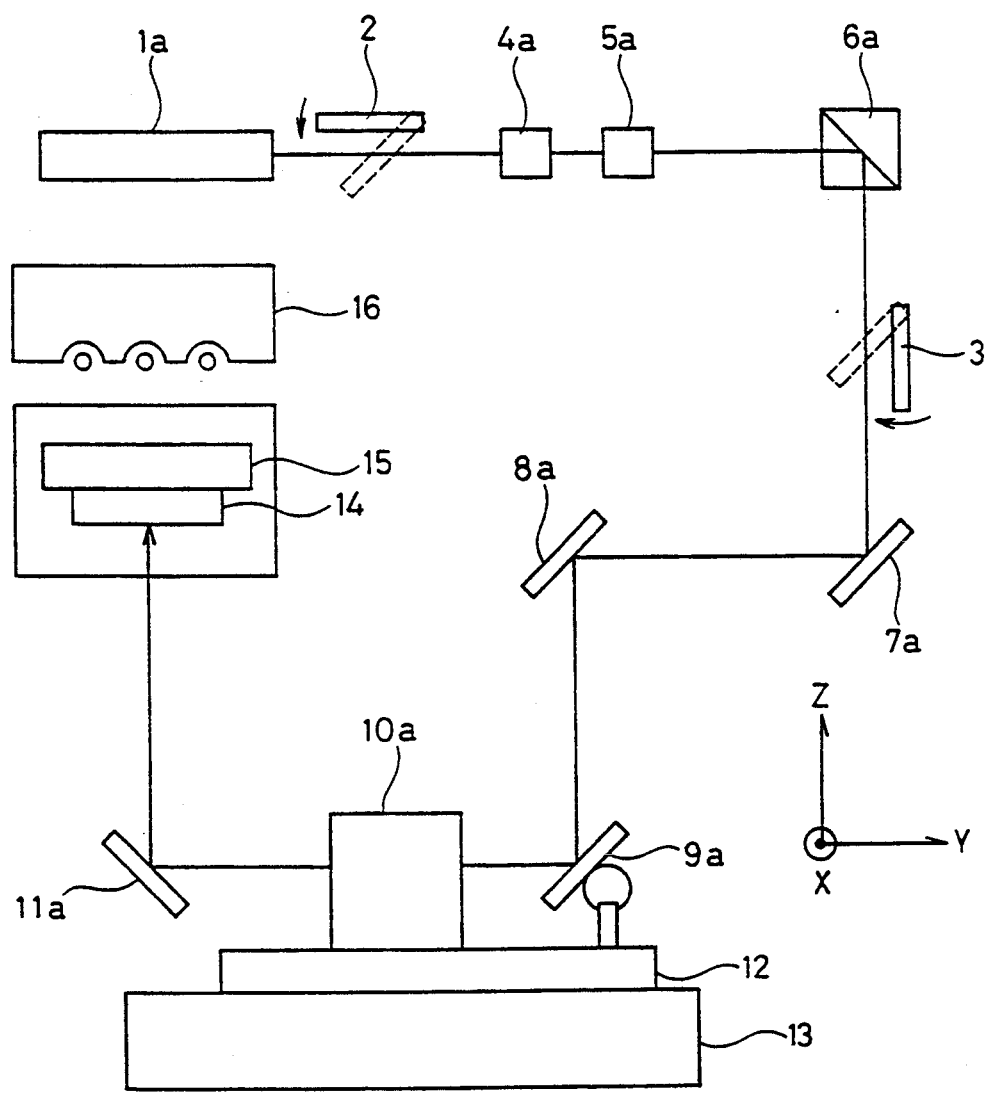
FIG. 6 is a block diagram showing a structure of a third embodiment of the laser beam irradiating apparatus in accordance with the present invention.

A third embodiment of the present invention in which lens-unit optical components are also improved will be described with reference to FIG. 6. In this embodiment, the lens-unit optical components includes f-$\theta$ lens 10a and beam expander 4a. As is well known, there are intensive light emission at the wavelength of 488 nm and 514.5 nm in the argon ion laser. In order to re-crystallize as wide area as possible by one laser beam scanning, the laser power should necessarily be large. Therefore, laser beams of these two wavelength are used as the laser anneal light source and the processing is done by multiple lines. Accordingly, the lens-unit should be achromatic unit. For achromatism, it is necessary to use at least two materials having different refractive indexes, and therefore it is not possible to form all lens-unit optical components by quartz. As for the f-$\theta$ lens, influence of thermal deformation is small since the laser beam moves through the lens. Therefore, BK7 may be used as the material as in the prior art. However, quarts is surely a better material. As for the beam expander, it is much influenced by thermal deformation, and therefore quartz is far preferred to BK7 as its material.

In these fields of applications in which precision is desired in accordance with throughput of the laser anneal processing, it is not necessary to make the lens-unit achromatic by employing a single color of laser beam. Therefore, in such a case, quartz can be used for every lens material, and in that case, laser annealing can be carried out with very high uniformity. The third embodiment of the present invention shown in FIG. 6 has a structure assuming such a case. Argon ion laser source 1a 10 generally has sufficient output to melt non-single crystal layer and high output stability, either 488 nm or 514.5 nm wavelength is selected by a mirror, and intense laser beam is output only at the selected wavelength. This laser source is capable of continuous wave in the order of 20 W. Beam expander 4a expands luminous flux of the laser beam output from argon ion laser source 1a and is formed of synthetic quarts. f-$\theta$ lens 10a receives laser beam which has been swung by X-axis rotation mirror 9a, reduces the diameter of the laser beam to be about 100 $\mu m\phi$ at the surface of the object 14 to be processed for scanning and irradiation at a constant speed, and it is formed of synthetic quartz. The same reference characters as in FIG. 4 denote the same or corresponding portions.

In this embodiment, by making the laser beam from the laser source 1a achromatic, fabrication of optical components employing lenses formed of synthetic quartz is made possible. By doing so, a laser beam irradiating apparatus which is capable of laser annealing of still higher precision than the first and second embodiments described above can be obtained.

Figure 7:
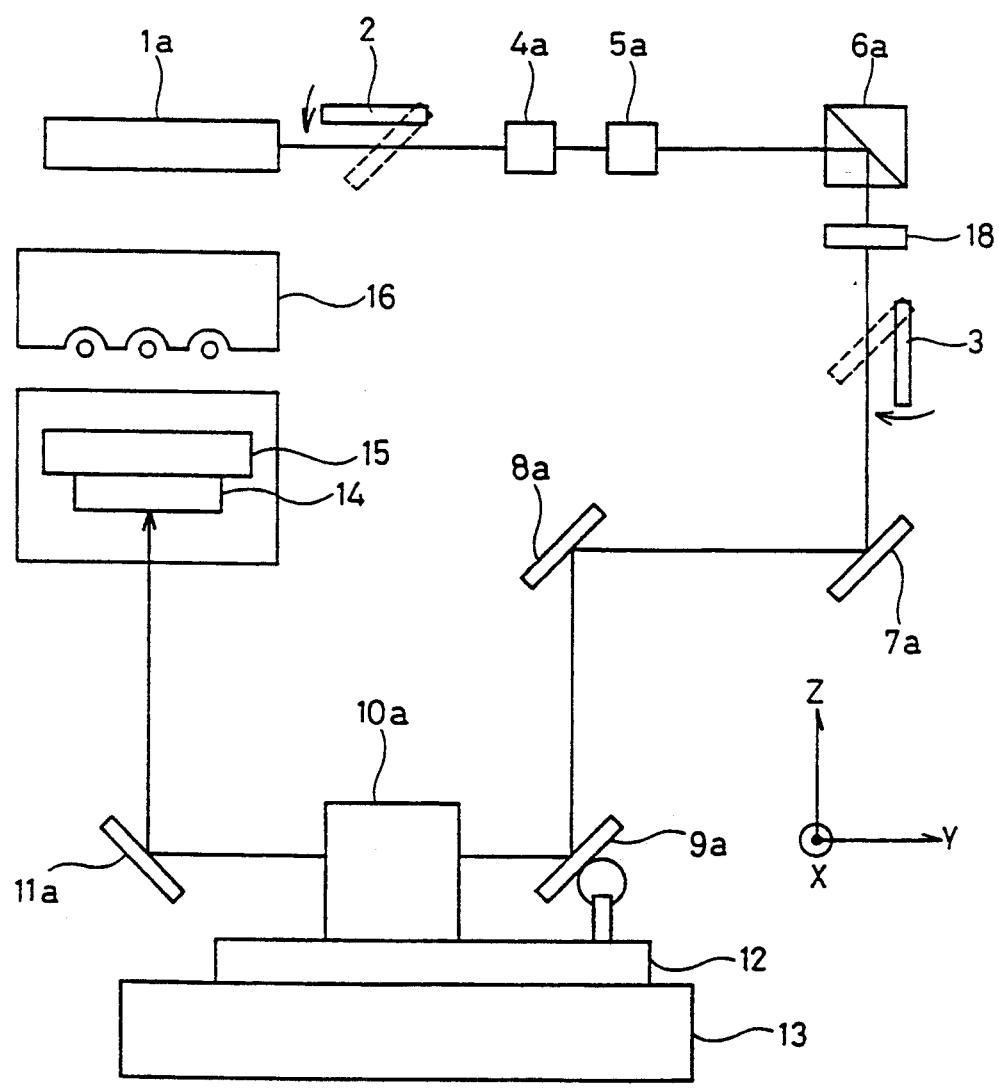
FIG. 7 is a block diagram showing a structure of a fourth embodiment of the laser beam irradiating apparatus in accordance with the present invention.

For laser annealing of still high uniformity, quarter wave plate 18 for providing circular polarization of the laser beam may be inserted in the path after the polarizing prism 6a to mirror 7a, as shown in FIG. 7. In this case also, it is desired to use the plate formed of synthetic quartz which has a smaller thermal expansion coefficient.

In each of the above described embodiments, rotation mirror 9 or 9a is used in the direction of X-axis, and Y-axis stage 13 is used in the direction of the Y-axis for laser beam scanning. Two rotation mirrors may be used for both X and Y-axis for scanning. Alternatively, scanning may be done with the sample 14 being moved and the laser beam fixed. There are various laser beam irradiating apparatuses having different mechanisms. However, the problem of instability of the optical system caused by heat is common in these apparatuses even if they have different scanning mechanisms. Therefore, the present invention provides effect to solve the problem in any of these devices.

As described above, by the laser beam irradiating apparatus of the present invention, the beam profile of the laser beam is stabilized, re-crystallization by every laser beam scanning can be carried out uniformly, and laser annealing of high precision becomes possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A laser beam irradiating apparatus containing means for scanning for irradiating a surface of an object with a laser beam through an optical system while scanning the surface to anneal the object, wherein the optical system includes, at least partially, a plurality of optical components formed of an optical material having a smaller thermal expansion coefficient than that of an optical material BK7.

2. The laser beam irradiating apparatus according to claim 1, wherein
the optical components include optical components for reflecting the laser beam, each reflecting optical component having a substrate formed of an optical material having a smaller thermal expansion coefficient than that of the optical material BK7.

3. The laser beam irradiating apparatus according to claim 2, wherein
said optical component for reflecting the laser beam includes a mirror having a reflective coating film formed by a dielectric multi-layered film provided on a surface of said substrate employing the optical material having a smaller thermal expansion coefficient than that optical material BK7.

4. The laser beam irradiating apparatus according to claim 2, wherein
the optical material having a smaller thermal expansion coefficient than that of the optical material BK7 includes a ceramic having a smaller thermal expansion coefficient than that of the optical material BK7.

5. The laser beam irradiating apparatus according to claim 1, wherein
the optical components include an optical components for transmitting the laser beam formed by an optical material having a smaller thermal expansion coefficient than that of an optical material BK7.

6. The laser beam irradiating apparatus according to claim 1, wherein
the optical material having a smaller thermal expansion coefficient than that of the optical material BK7 includes quartz.

7. The laser beam irradiating apparatus according to claim 6, wherein
the quartz includes synthetic quartz.

8. A laser beam irradiating apparatus containing means for scanning for irradiating a surface of an object with a laser beam through an optical system while scanning the surface to anneal the object, wherein
the optical system includes, at least partially, a substantially planar optical component formed of an optical material having a smaller thermal expansion coefficient than that of an optical material BK7.

9. The laser beam irradiating apparatus according to claim 8, wherein
the optical component includes an optical component for reflecting the laser beam, the optical component having a substrate formed of an optical material having a smaller thermal expansion coefficient than that of the optical material BK7.

10. The laser beam irradiating apparatus according to claim 9, wherein
the optical material having a smaller thermal expansion coefficient than that of the optical material BK7 includes a ceramic having smaller thermal expansion coefficient than that of the optical material BK7.

11. The laser beam irradiating apparatus according to claim 9, wherein
the optical component for reflecting the laser beam includes a mirror having a reflective coating film formed by a dielectric multi-layered film provided on a surface of said substrate employing the optical material having a smaller thermal expansion coefficient than that of optical material BK7.

12. The laser beam irradiating apparatus according to claim 8, wherein
optical material having a smaller thermal expansion coefficient than that of the optical material BK7 includes quartz.

13. The laser beam irradiating apparatus according to claim 12, wherein
quartz includes synthetic quartz.

14. The laser beam irradiating apparatus according to claim 8, wherein
the optical component includes an optical component for transmitting the laser beam formed by an optical material having a smaller thermal expansion coefficient than that of optical material BK7.

15. A laser beam irradiating apparatus containing means for scanning for irradiating a surface of an object with a laser beam through an optical system while scanning the surface to anneal the object, wherein
the optical system includes, at least partially, an optical component for reflecting the laser beam, the optical component having a substrate formed of an optical material having a smaller thermal expansion coefficient than that of an optical material BK7, the optical component further having a mirror with a reflective coating film formed by a dielectric multi-layered film provided on a surface of the substrate formed of the optical material having a smaller thermal expansion coefficient than the optical material BK7.

16. A laser beam irradiating apparatus containing means for scanning for irradiating a surface of an object with a laser beam through an optical system while scanning the surface to anneal the object, wherein
the optical system includes, at least partially, an optical component for transmitting the laser beam formed of an optical material having a smaller thermal expansion coefficient than that of an optical material BK7.

17. The laser beam irradiating apparatus according to claim 16, wherein
the optical component for transmitting the laser beam includes a lens-unit formed of an optical material having a smaller thermal expansion coefficient than that of the optical material BK7.

18. The laser beam irradiating apparatus according to claim 16, wherein
the optical component for transmitting the laser beam includes a non-lens-unit formed of an optical material having a smaller thermal expansion coefficient than that of the optical material BK7.

19. A laser beam irradiating apparatus containing means for scanning for irradiating a surface of an object with a laser beam through an optical system while scanning the surface to anneal the object, wherein
the optical system includes, at least partially, an optical component for reflecting the laser beam, the optical component having a substrate formed of an optical material which includes a ceramic having a smaller thermal expansion coefficient than that of an optical material BK7.

20. A method of annealing an object, comprising the steps of passing a laser beam through an optical system which includes, at least partially, a plurality of optical components formed of an optical material having a smaller thermal expansion coefficient than that of an optical material BK7 to irradiate a surface of the object, and scanning the object surface with the beam.

21. A method of annealing an object, comprising the steps of passing a laser beam through an optical system which includes, at least partially, a substantially planar optical component formed of an optical material having a smaller thermal expansion coefficient than that of an optical material BK7 to irradiate a surface of the object, and scanning the object surface with the beam.

22. A method of annealing an object, comprising the steps of passing a laser beam through an optical system which includes, at least partially, an optical component for reflecting the laser beam, the optical component having a substrate formed of an optical material having a smaller thermal expansion coefficient than that of an optical material BK7, the optical component further having a mirror with a reflective coating film formed by a dielectric multi-layered film provided on a surface of the substrate formed of the optical material having a smaller thermal expansion coefficient than the optical material BK7, to irradiate a surface of the object, and scanning the object surface with the beam.

23. A method of annealing an object, comprising the steps of passing a laser beam through an optical system which includes, at least partially, an optical component for transmitting the laser beam formed of an optical material having a smaller thermal expansion coefficient than that of an optical material BK7 to irradiate a surface of the object, and scanning the object surface with the beam.

24. A method of annealing an object, comprising the steps of passing a laser beam through an optical system which includes, at least partially, an optical component for reflecting the laser beam, the optical component having a substrate formed of an optical material which includes a ceramic having a smaller thermal expansion coefficient than that of an optical material BK7, to irradiate a surface of the object, and scanning the object surface with the beam.

* * * * *